United States Patent [19]

Parker et al.

[11] Patent Number: 4,836,646
[45] Date of Patent: Jun. 6, 1989

[54] PLASTIC OPTICAL FIBER FOR IN VIVO USE HAVING A BIO-COMPATIBLE POLYUREASILOXANE COPOLYMER, POLYURETHANE-SILOXANE COPOLYMER, OR POLYURETHANEUREASILOXANE COPOLYMER CLADDING

[75] Inventors: Theodore L. Parker; G. Robert Collins, both of Walnut Creek, Calif.

[73] Assignee: The Dow Chemical Company, Midland, Mich.

[21] Appl. No.: 161,622

[22] Filed: Feb. 29, 1988

[51] Int. Cl.$^4$ .............................. G02B 6/00; G02B 6/10
[52] U.S. Cl. ................................ 350/96.34; 350/96.30; 427/160
[58] Field of Search ............... 350/96.30, 96.34, 96.33, 350/96.32; 427/160, 163; 528/28

[56] References Cited

U.S. PATENT DOCUMENTS

| | | | |
|---|---|---|---|
| 4,133,915 | 1/1979 | Noethe et al. | 427/1.60 |
| 4,472,019 | 9/1984 | Bishop et al. | 380/96.3 |
| 4,621,113 | 11/1986 | Collins | 524/196 |
| 4,631,329 | 12/1986 | Gornowitcz | 528/28 |

FOREIGN PATENT DOCUMENTS 2103785A 12/1983 United Kingdom .

OTHER PUBLICATIONS

A. D. Pearson et al., "Fiber Optics," *Kirk-Othmer: Encyclopedia of Chemical Technology*, 3rd Ed., vol. 10, (1980), pp. 125 to 147.

A. C. Levy, "Optical Fibers," *Encyclopedia of Polymer Science and Engineering*, vol. 7, pp. 1 to 15, (1986).

F. H. Ulrich, "Urethane Polymers," *Kirk-Othmer: Encyclopedia of Chemical Technology*, vol. 23, (1983), pp. 576-608.

J. E. McGrath, "Polyureasiloxane Copolymers", *Chemical Abstracts*, vol. 106, (1987), 67737.

C. G. Gebelein, "Prosthetic and Medical Devices," *Kirk-Othmer Encylopedia of Chemical Technology*, 3rd Ed., vol. 19, (1982), pp. 275-313.

Wong et al., "Structure Property Relationships of Transparent Cycloaliphatic Polyurethane Elastomers," 186th Annual National Chemical Society (Proceedings), Washington, D.C., (1983).

*Primary Examiner*—William L. Sikes
*Assistant Examiner*—Akm E. Ullah

[57] ABSTRACT

The present invention pertains to a flexible organic polymeric optical fiber core having an adherent flexible organic polymer cladding on the outer surface. More particularly, the invention relates to an organic polymeric optical fiber having a polyureasiloxane copolymer, polyurethane-siloxane copolymer, or polyurethaneurea-siloxane copolymer cladding for in vivo use in the tissue of a living mammal, preferably a human being. In addition to compatibility in live tissue and body fluids, the fiber must be capable of repeatedly being deformed in a small bend radius without losing the ability to transmit light. The clad optical fibers useful to measure levels of components (e.g. pH, oxygen, carbon dioxide) in living, moving tissue, such as the heart or lungs.

13 Claims, 3 Drawing Sheets

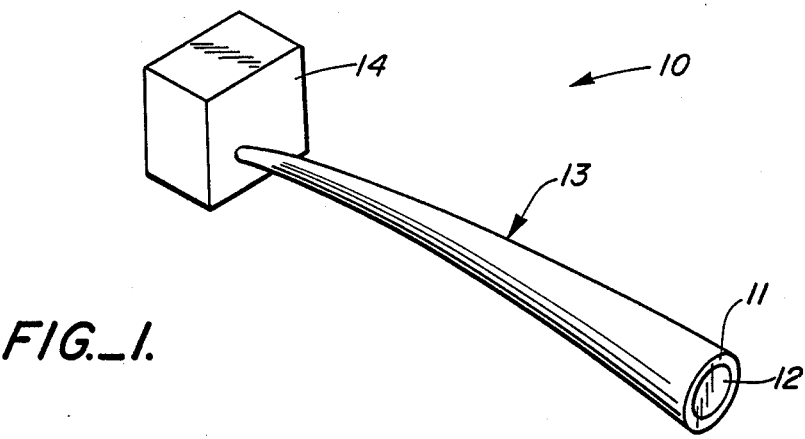
FIG._1.
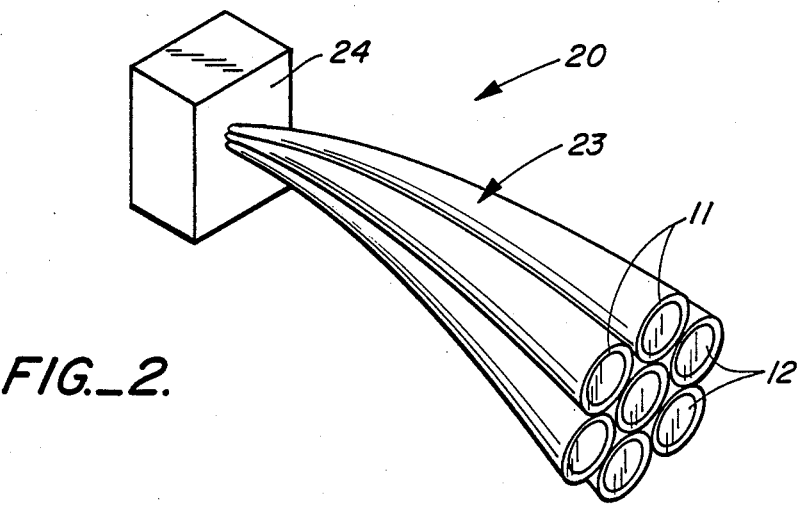
FIG._2.

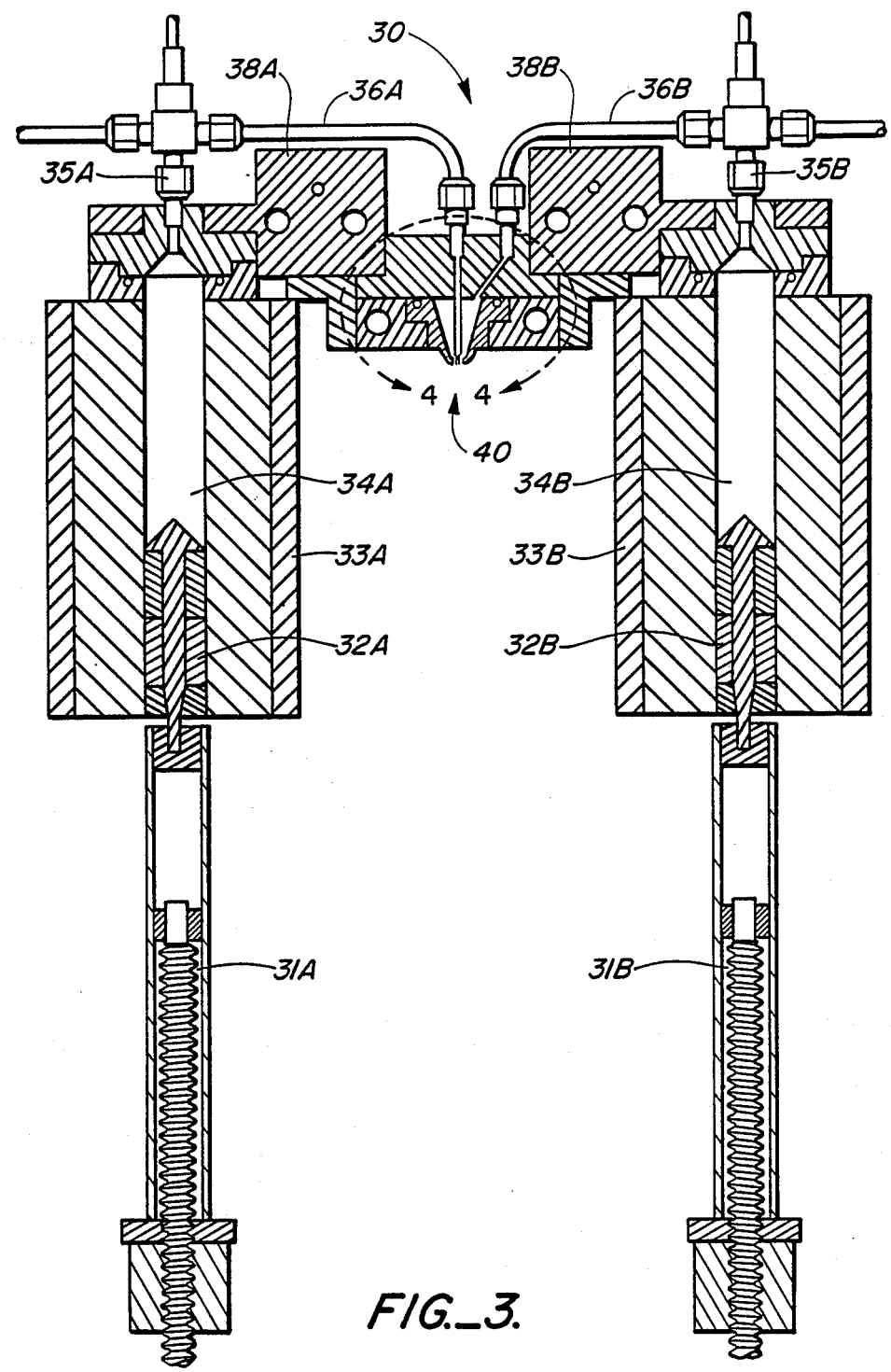
FIG._3.

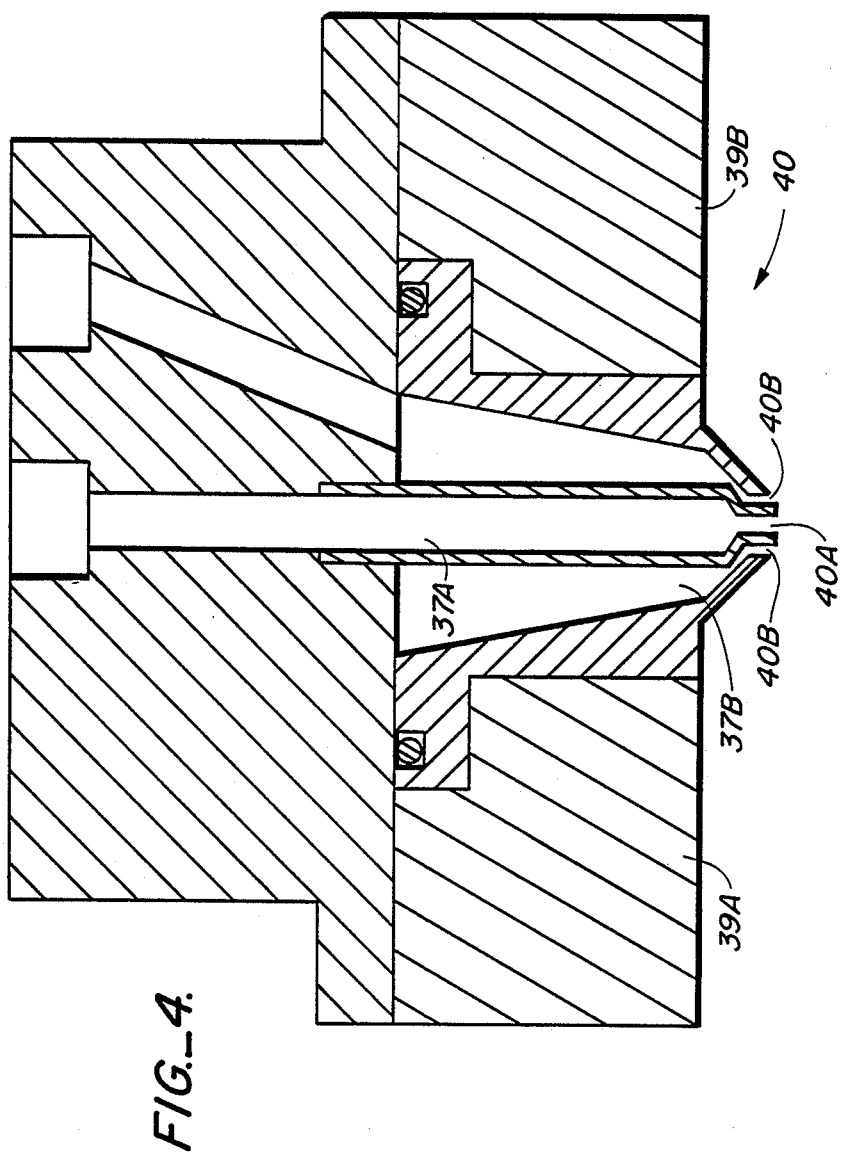
FIG._4.

PLASTIC OPTICAL FIBER FOR IN VIVO USE HAVING A BIO-COMPATIBLE POLYUREASILOXANE COPOLYMER, POLYURETHANE-SILOXANE COPOLYMER, OR POLYURETHANEUREASILOXANE COPOLYMER CLADDING

BACKGROUND OF THE INVENTION

1. Field of the Invention

The present invention pertains to a flexible optical fiber core having an adherent flexible organic polymeric cladding on the outer surface. Specifically, the invention relates to an optical fiber for in vivo use in the tissue of a living mammal wherein the optical fiber has a flexible polyureasiloxane copolymer, polyurethane-siloxane copolymer, or polyurethaneureasiloxane copolymer cladding on the outer surface of the optical core. The optical fiber core preferably has a refractive index of at least 0.01 greater than the refractive index of the polymeric cladding.

2. Description of the Related Art

Fiber optics have been known for a number of years as described by A. D. Pearson et al. in "Fiber Optics" in the *Kirk-Othmer:Encyclopedia of Chemical Technology*, 3rd Ed., Vol. 10, John Wiley & Sons, New York, N.Y., pp. 125–147, published in 1980. Also see A. C. Levy, "Optical Fibers," in the *Encyclopedia of Polymer Science and Engineering*, H. F. Mark et al (ed.) Vol. 7, pp. 1 to 15, John Wiley and Sons, New York, New York, published in 1986.

S. R. Goldstein, European Patent No. 073-558-A2 (March 1983) discloses the use of a chemical sensor for pH using a pH sensitive dye with an optical sensor.

S. Kingsley, et al., in *FC-7; Fiber Optics Sensors*, Chapter 10 "Chemical Sensors", published in 1984 by Information Gate Keepers, 214 Harvard Avenue, Boston, Mass. 02134, discusses the use of a number of sensors for in vitro use. J. H. W. Cramp, et al., U.K. Patent No. 2,103,786A discloses chromophoric sensing optical fiber, which patent is incorporated herein by reference. A chromophoric tip which is sensitive to pH, specific chemicals, temperature, etc. is placed at the end of the optical fiber. As the color of the chromophore changes in vivo, the change is transmitted back to the optical fiber and measured.

B. Noethe et al. in U.S. Pat. No. 4,133,915 discloses an optical glass fiber which are first coated with a high boiling optically clear liquid, then coated with a curable resin, such as a urethane.

T. E. Bishop et al. in U.S. Pat. No. 4,472,019 disclose radiation curable coating compositions adapted for application to buffer-coated glass optical fibers. The new composition comprises (1) from 25 to 70% of a diethyleniterminated polyurethane (which may include urea linkages), where the polyurethane is based on a diisocyanate having an average molecular weight of from 400 to 5000 daltons, (2) from 5% to 40% of a diethylenically unsaturated ester of a diglycidyl ether of a bisphenol having a molecular weight up to about 1000, and (3) from 5 to 30% of a liquid radiation-curable monoethylenically unsaturated monomer having a Tg above about 55° C., especially N-vinyl pyrrolidone.

Urethane polymers are discussed in general by H. Ulrich, in "Urethane Polymers", *Kirk-Othmer: Encyclopedia of Chemical Technology*, Vol. 23, pp. 576–608, published in 1983 by John Wiley and Sons, of New York, N.Y.

Polyureasiloxane copolymers are known as described by J. E. McGrath, et al., in *Chemical Abstracts.* Vol. 106: 67738 (1987).

Polyurethane-siloxane copolymers are known as described by G. A. Gornowitcz in U.S. Pat. No. 4,631,329.

Polyurethaneureasiloxane copolymers are known as described by Gornowitcz above.

All of the above references are incorporated herein by reference.

None of these references teach or suggest a current plastic for use as an organic polymeric optical fiber or a polymeric clad for long-term use in the tissue of a living mammal. An optical fiber for in vivo use in the body area of the moving, beating heart, such as would be required in a heart pacemaker or a defibrillator, needs specific mechanical properties in addition to live tissue/body fluid compatibility. Such a fiber must be capable of being repeatedly deformed in a small bend radius without losing the ability to transmit light. That is, such an optical fiber for use in a moving, beating heart must have tremendous resistance to the development of microbending optical loss. These optical fibers of the present invention are useful in any body area for the measurement of various levels of substances or materials in a human body.

SUMMARY OF THE INVENTION

The present invention relates to a biocompatible organic resin coated flexible optical fiber comprising an organic polymeric core and an organic cladding wherein the biocompatible organic polymeric cladding is selected from:

(a) a polyureasiloxane copolymer of the formula:

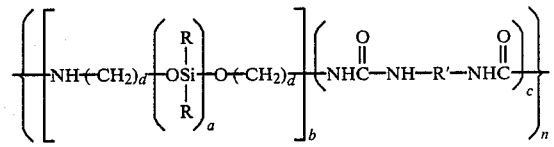

wherein
R is an alkyl group having from 1 to 19 carbon atoms,
R' is selected from a straight chain alkylene, a branched alkylene or a cyclic alkylene having from 1 to 19 carbon atoms,
a is an integer between 2 and 200,
b and c are each about the same integer between about 50 and 10,000,
d is the integer 2, 3 or 4,
n is an integer selected so that the total molecular weight of the polymer is about 25,000 daltons or greater;

(b) a polyurethane-siloxane copolymer of the

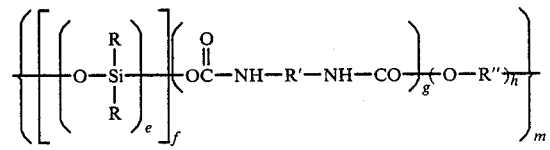

R and R' are as defined hereinabove,
R" is an alkylene having from 1 to 10 carbon atoms;

e is an integer between 2 and 200, f and h are each integers wherein the sum of f and h is about equal to g which is an integer between about 50 and 10,000, m is an integer greater than 100 such that the total molecular weight of the polyurethane-siloxane cladding about is 25,000 daltons or greater; or (c) a polyurethaneureasiloxane copolymer of the formula:

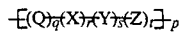

wherein
Q is

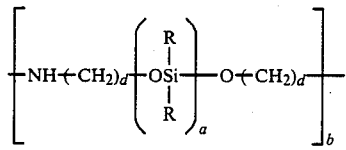

X is

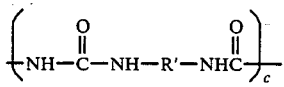

Y is $-(OR'')_h-$, and
Z is

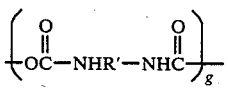

wherein R, R', R'', a, b, c, d, g and h are defined hereinabove, q, r, s, t and p are each integers between about 50 and 10,000 such that the sum of r and t is about equal to the sum of q and s, and p is an integer greater than 100 such that the total molecular weight of the polymeric cladding is about 25,000 daltons or greater, and the organic polymer optical fiber core is selected from optically clear organic polymers having a refractive index of between about 1.4 and 1.9.

BRIEF DESCRIPTION OF THE DRAWINGS

FIG. 1 shows an schematic view of a single clad plastic optical fiber.

FIG. 2 shows an schematic view of an array of clad plastic optical fibers to act as a probe increasing a signal or to detect different signals.

FIG. 3 shows a cross-sectional representation of a polymeric co-extrusion apparatus.

FIG. 4 shows a cross-sectional representation of the spinnerette region of the co-extension apparatus along line 4—4 of FIG. 3.

DETAILED DESCRIPTION OF THE INVENTION AND PREFERRED EMBODIMENTS

Definitions

As used herein:

"Diisocyanate" refers to the aliphatic diisocyantes described by Collins, U.S. Pat. No. 4,621,113, which is incorporated herein by reference.

"Glycol" refers to glycols as described by G. R. Collins (above), and also includes short segments of diols having 2–6 carbon atoms.

"Chain Extender" refers to short chain non flexibilizing compounds as described by Collins above.

"Macroglycol" refers to a polyglycol having a molecular weight of between about 1000 to about 6000 daltons as described by Collins above.

Referring now to FIG. 1, the optical fiber core 12 clad 11 is connected via line 13 in an analytical system 10. Recorder or analyzer 14 can be any one of a group of analytical/recording/or storage devices known in the art. FIG. 2 shows a tightly packed array 20 of the optical fiber core 12 and cladding 11, which is connected to analyzer/detector 24 via multifilament 23. An array is used to provide an additive signal for measurement or can be used to measure different aspects of the fluid or tissue within the body, e.g., pH, oxygen, carbon dioxide, etc. The optical fiber of the present invention, for use such as in a beating heart, must have tremendous resistence to the development of microbending optical loss. A preferred fiber is one where the optical core has a refractive index of at least 0.01 greater than the refractive index of the polymeric cladding.

Currently available plastic optical fibers are usually clad with poly(methyl methylacrylate) (PMMA), or poly-(vinylidene fluoride) (PVDF). However, currently available polymers are not suitable for contact with living tissue and body fluids. New sensing devices have been developed and are available for sensing biologically important chemical species (such as pH, $pO_2$, $pCO_2$, and the like) using optrodes (optical sensing devices). By proper selection of the optical properties in a core plastic, and a biologically compatible polymeric optical clad, a polymer optical fiber (POF) capable for use in real time in vivo medical diagnostics is produced. Typically, the use of a poly(urethane) for use in optical fibers is restricted to buffer coats over the optical glass core, and under the over-wrap in an optical cable.

In the present invention, the polyureasiloxane copolymer, polyurethane-siloxane copolymer, or polyurethaneureasiloxane copolymer layer is both the optical clad and the exterior layer to be in contact with the body tissue and body fluids. In this way, a smaller, thinner, more supple optical fiber (filament) is prepared for insertion directly into the body and through confined orifices, such as blood vessels.

A preferred optical core for the fiber is independently selected from any of the following poly(styrene), PMMA, poly(carbonate), poly(urethane) or copolymers of styrene and methyl methacrylate, styrene and methyl acrylate, methyl methacrylate and ethyl acrylate, styrene and α-methyl styrene, or styrene and vinyl toluene, or the like.

Various compositional, structural and processing factors which affect the biological and physical properties of segmented poly(urethanes) are well known and described in Collins, U.S. Pat. No. 4,621,113 and also by C. G. Gebelein in "Prosthetic and Medical Devices" In *Kirk-Othmer: Encyclopedia of Chemical Technology*, 3rd ed., Vol. 19, pp 275-313, published in 1982; and also see Wong et al, "Structure-Property Relationships of Transparent Cycloaliphatic Polyurethane Elastomers," 186th Annual National American Chemical Society (Proceedings), Washington, D.C., published in 1983, both of which are incorporated herein by reference.

In one aspect the macroglycol of the polyurethane of Collins above may be a dihydroxyl containing siloxane. These siloxane diols have a molecular weight of between about 200 and 4,000 daltons. Representative siloxane diols, such as bisdihydroxytetramethylsiloxane or polydimethyl-siloxanediol (molecular weight of about 4,000 daltons), are obtained from either Petrarch Systems, Inc. of Bristol, Pa. or PCR, Inc. of Gainsville, Fla.

In another aspect, the macroglycol of the polyurethane of Collins above may be replaced by a diaminosiloxane. These diamino siloxanes have a molecular weight of between about 200 and 4,000 daltons. Representative diaminosiloxanes, such as 1,3-bis (3-aminopropyl) tetramethyldisiloxane (MW about 300 daltons), or bis(3-aminopropyl) capped dimethylsiloxane (MW about 4000) are obtained from either Petrarch Systems, Inc., of Bristol, Pa. or PCR, Inc. of Gainesville, Fla.

The other starting compounds, reagents or intermediates of the present invention are also generally obtainable from Aldrich Chemical Company, Milwaukee, Wis., or from the company identified in *Chemical Sources - U.S.A.*, published annually by Directories Publishing, Inc., Clemson, S.C.

In one aspect two components are used to prepare the polyureasiloxane. These are diaminosiloxane which replaces the macroglycol of Collins above, in a ratio of 1 to 1, and a diisocyanate. The molecular weight of the diaminosiloxane and diisocyanate are between about 200–4,000 and 160–400, respectively. Representative diaminosiloxanes are obtained from either Petrarch Systems, Inc. of Bristol, Pa. or PCR, Inc. of Gainesville, Fla.

The linear segmented polyurethanes described by Collins above are adapted for use in this invention. Preferably the macroglycol/diisocyanante/chain extender composition of the polymer has a molar ratio of between about 0.5 and 1.5/5 to 7/4 to 6 respectively.

A preferred polyurethanesiloxane (II) clad is one having about a 1/6/5 molar ratio of Collins above wherein the macroglycol is replaced by a polydimethylsiloxanediol having a weight average of molecular weight of about 2000 daltons.

A preferred polyurethaneureasiloxane (III) is one having about 1/6/5 molar ratio of Collins above wherein the macroglycol is replaced by bis-(3-aminopropyl) capped dimethylsiloxane having a weight average molecular weight of about 2000 daltons.

A preferred poly(ureasiloxane)(I) is one having about a 1/1 molar ratio of Collins above wherein the macroglycol is replaced by bis(3-aminopropyl) capped dimethylsiloxane having a molecular weight of about 2000 daltons and the diol chain extender is omitted.

Co-Extrusion—The plastic optical core and the polymeric cladding are simultaneously co-extruded from an apparatus as shown in FIGS. 3 and 4. FIG. 3 is a coextrusion apparatus 30.

Drive screw 31A for the molten polymer of the core is used to mechanically push seal piston 32A up through heated block 33A. The molten or softened polymer 34A is forced through lines 35A and 36A into chamber 37A to the middle opening 40A of the spinnerette shown in FIGS. 3 and 4. The core polymer is kept molten at the appropriate temperature using heat blocks 38A, 39A and 39B.

In a similar manner, drive screw 31B for the molten polymer of the cladding is used to mechanically push seal piston 32B up through heated block 33B. The molten or softened heated polymer 34B is forced through heated line 35B and 36B into chamber 37B to the concentric outer opening 40B of the spinnerette shown in FIGS. 3 and 4. The polymer is kept molten at the appropriate temperature using heat blocks 38B and 39A and 39B.

As is shown in cross-section in FIG. 4, at the top of the openings of the spinnerette, core polymer 34A enters at 37A and clad polymer 34B enters at 37B. The core polymer moves down through channel 37A and extrudes as a continuous small diameter solid cylinder at 40A. The clad polymer 34B moves down through channel 37B and extrudes as a continuous small diameter hollow cylinder at 40B. The cylinders combine, and the clad/core optical fiber is thus formed upon cooling.

In one preferred embodiment the flexible clad optical fiber is one where the flexible optical fiber core is selected from poly(styrene), poly(methacrylate), poly(carbonate) or poly(urethane) or copolymers of styrene and methyl methacrylate, styrene and methyl acrylate, methyl methacrylate and ethyl acrylate, styrene and α-methyl styrene, or styrene, and vinyl toluene, or the like.

In another preferred embodiment the flexible optical fiber is one where the organic polymeric cladding is a poly(ureasiloxane).

In still another preferred embodiment the flexible optical fiber is one where the flexible optical fiber core is selected from poly(styrene) or from a poly(urethane).

A preferred embodiment of the process is one where the temperatures of steps (b) (c) or (d) are each between about 200° and 450° F., especially about 300° to 375° F.

In another preferred embodiment, the process is one where the optical fiber organic polymer core is independently selected from poly(styrene), poly(methymethacrylate), poly(carbonate) or poly(urethane), especially the process where the organic polymeric cladding is a poly(ureasiloxane).

Existing commercial analytical instruments such as Hewlett Packard Model 47201A Ear Oximeter (Hewlett Packard Corporation, Page Mill Road, Palo Alto, Calif. 94304) are adapted to function with the biocompatible optical fiber of the present invention.

In another embodiment the clad optical fiber has an optical core with a refractive index which is at least 0.01 units greater than the refractive index of the cladding.

The optical fiber wherein the cladding is (a) a polyureasiloxane copolymer, independently (b) a polyurethane-siloxane copolymer, or (c) a polyurethaneureasiloxane copolymer.

In another embodiment the optical fiber has an optical core independently selected from poly(styrene), poly(methyl methacrylate), poly(carbonate) or poly(urethane) preferably when the optical core is selected from poly(styrene) or poly(urethane).

A preferred optical fiber is one where the cladding has a molecular weight of about 25,000 to 300,000 daltons.

A more preferred optical fiber of (a) is the optical fiber wherein R is methyl,

R' is

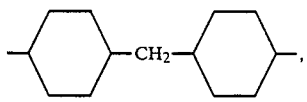

a is 3,
b and c are each between about 50 and 1,000,
d is 3; and
n is an integer selected so that the total molecular weight of the polymeric clad is between about 25,000 and 300,000 daltons.

A more preferred optical fiber of (b) is the optical fiber wherein:
R is methyl,
R' is

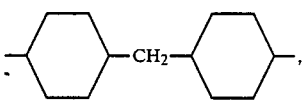

R" is 4,
e is 10,
f and g are each independently an integer between 50 and 100, and
the total molecular weight of the polymeric cladding is between about 25,000 and 300,00 daltons, more preferably between 25,000 and 100,000.

A more preferred optical fiber of (c) is the optical fiber wherein:
R is methyl,
R' is

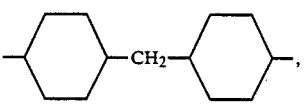

R" is 4,
a is 3,
b and c are each between about 50 and 1,000,
d is 3
g and h are each integers between 50 and 1,000;
q, r, s, t and p are each integers between 50 and 1,000 and the total molecular weight of the polymeric cladding is between about 25,000 and 300,000 daltons, more preferably between about 25,000 and 100,000.

The following examples are to be interpreted as being descriptive and illustrative only. They are not to be construed as being limiting in any way.

EXAMPLE 1

Poly(styrene) Core Having a Plastic Cladding (a) A dual ram coextrusion apparatus as is available in the art or as shown in FIGS. 3 and 4 is charged for the core with poly(styrene) pellets, polymer optical fiber (POF) grade, MW 200,000, Dow Chemical Co., Midland, Mich., 48640 is heated to 340° F. The cladding chamber contains poly(ureasiloxane)(I). The transfers are held at 360° F. for poly(styrene). The spinnerette tip is held at 340° F. A core/clad concentric polymeric optical fiber is melt extruded and then redrawn at 130° C. at a 4 to 1 draw ratio to give a 750 micron diameter clad optical fiber having a poly(styrene) core. The clad has a thickness of about 10 microns. The light attenuation value for the fiber is found to be 1.15 decibels/kilometer.

(b) The coating of the core of Example 3(a) is repeated except that the poly(ureasiloxane) (I) is replaced by poly(urethane siloxane) (II). A useful clad optical fiber is obtained.

(c) The coating of the core of Example 3(a) is repeated except that the poly(ureasiloxane) (I) is replaced by a poly(ureaurethanesiloxane) (III). A useful clad optical fiber is obtained.

EXAMPLE 2

Poly(styrene) Core

The process described by Example 1 is followed except for the following:

A spinnerette is used and a much better optical fiber is produced at a temperature of 350° F. More size fluctuation is observed at 330° F. The spinnerette produces a non-concentric fiber having an attenuation equal to 2.5 dB/m. The stress (tension) is measured at 20-25 gram for a 0.25 mm fiber.

EXAMPLE 3

Use of the Clad Optical Fiber in Detecting the pH Level in the Blood

The optical fiber of Example 1A has a chromophore attached to the analytical probe end. This chromophore is sensitive and changes color as pH level changes. The tip is inserted surgically to the left ventricle of the beating heart of a living dog. The pH level is monitored for 90 days without a decrease in sensitively by adapting the instruments described by either J. H. W. Cramp, et al. or S. R. Goldstein, et al. above, or the Hewlett Packard Ear Oximeter.

While only a few embodiments of the invention have been shown and described herein, it will become apparent to those skilled in the art that various modifications and changes can be made in a polymer clad optical fiber, its fabrication, or its use as an optical probe in a living mammal, preferably a human being, without departing from the spirit and scope of the present invention. All such modifications and changes coming within the scope of the appended claims are intended to be covered out thereby.

We claim:

1. A biocompatible organic resin coated flexible optical fiber comprising an organic polymeric core and an organic cladding wherein the biocompatible organic polymeric cladding is selected from:
(a) a polyureasiloxane copolymer of the formula:

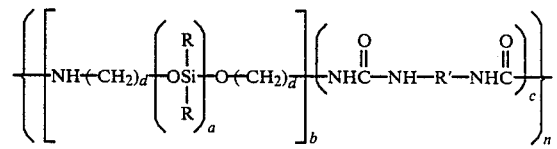

wherein
R is a alkyl group having from 1 to 19 carbon atoms,
R' is selected from a straight chain alkylene, a branched alkylene or a cyclic alkylene having from 1 to 19 carbon atoms,
a is an integer between 2 and 200, b and c are each about the same integer between about 50 and 10,000, d is the integer 2, 3 or 4, n is an integer selected so that the total molecular weight of the polymer is about 25,000 daltons or greater, (b) a polyurethane-siloxane copolymer of the formula:

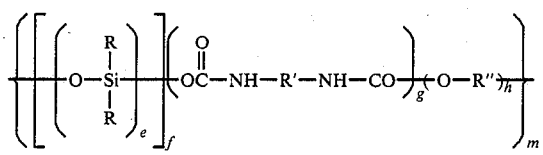

R and R' are as defined hereinabove,

R" is an alkylene having from 1 to 10 carbon atoms;

e is an integer between 2 and 200, f and h are each integers wherein the sum of f and h is about equal to g which is an integer between about 50 and 10,000, m is an integer greater than 100 such that the total molecular weight of the polyurethane-siloxane cladding about is 25,000 daltons or greater; or (c) a polyurethaneureasiloxane copolymer of the formula:

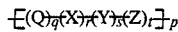

wherein

Q is

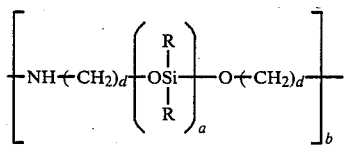

X is

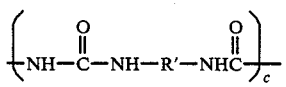

Y is $-(OR")_h-$, and

Z is

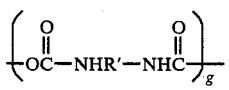

wherein R, R', R", a, b, c, d, g and h are defined hereinabove, q, r, s, t and p are each integers between about 50 and 10,000 such that the sum of r and t is about equal to the sum of q and s, and p is an integer greater than 100 such that the total molecular weight of the polymeric cladding is about 25,000 daltons or greater, and the organic polymer optical fiber core is selected from optically clear organic polymers having a refractive index of between about 1.4 and 1.7.

2. The optical fiber of claim 1 wherein the optical core has a refractive index which is at least 0.01 units greater than the refractive index of the cladding.

3. The optical fiber of claim 2 wherein the cladding is (a) a polyureasiloxane copolymer.

4. The optical fiber of claim 2 wherein the cladding is (b) a polyurethane-siloxane copolymer.

5. The optical fiber of claim 2 wherein the cladding is (c) a polyurethaneureasiloxane copolymer.

6. The optical fiber of claim 1 wherein the optical core is independently selected from poly(styrene), poly(methyl methacrylate), poly(carbonate), poly(urethane) or a copolymer of styrene and methyl methacrylate, styrene and methyl acrylate, methyl methacrylate and ethyl acrylate, styrene and α-methyl styrene, or a styrene and vinyl toluene.

7. The optical fiber of claim 6 wherein the optical core is selected from poly(styrene) or poly(urethane).

8. The optical fiber of claim 3 wherein the cladding has a molecular weight of about 25,000 to 300,000 daltons.

9. The optical fiber of claim 1 wherein R is methyl, R' is

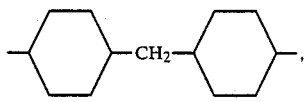

a is 3, b and c are each between about 50 and 1,000, d is 3; and n is an integer selected so that the total molecular weight of the polymeric clad is between about 25,000 and 300,000 daltons.

10. The optical fiber of claim 4 wherein: R is methyl, R' is

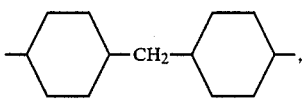

R" is 4, e is 10, f and g are an integer between 50 and 100, and the total molecular weight of the polymeric cladding is between about 25,000 and 300,000 daltons.

11. The optical fiber of claim 5 wherein: R is methyl, R' is

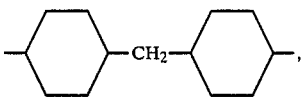

R" is 4, a is 3, b and c are each between about 50 and 1,000, d is 3, g and h are each integers between 50 and 1,000;

q, r, s, t and p are each integers between 50 and 1,000 and the total molecular weight of the polymeric cladding is between about 25,000 and 300,000 daltons.

12. The optical fiber of claim 2 wherein the optical core has a refractive index which is between about 0.01 and 0.17 units greater than the refractive index of the cladding.

13. The optical fiber of claim 12 wherein the polymeric optical fiber core is selected from poly(styrene), poly(methyl methacrylate), poly(carbonate), poly(urethane) or a copolymer of styrene and methyl methacrylate, styrene and methyl acrylate, methyl methacrylate and ethyl acrylate, styrene and α-methyl styrene, or a styrene and vinyl toluene.

* * * * *